US012760203B2

(12) United States Patent
Lin et al.

(10) Patent No.: US 12,760,203 B2
(45) Date of Patent: Oct. 13, 2026

(54) WATER-BASED HOT-MELT ADHESIVE AND MEDICAL PAPER COATING WITH WATER-BASED HOT MELT ADHESIVE

(71) Applicant: BenQ Materials Corporation, Taoyuan City (TW)

(72) Inventors: Yen-Ling Lin, Taoyuan City (TW); Ching-Huang Chen, Taoyuan City (TW)

(73) Assignee: BenQ Materials Corporation, Taoyuan City (TW)

( * ) Notice: Subject to any disclaimer, the term of this patent is extended or adjusted under 35 U.S.C. 154(b) by 164 days.

(21) Appl. No.: 18/882,724

(22) Filed: Sep. 11, 2024

(65) Prior Publication Data

US 2025/0297139 A1 Sep. 25, 2025

(30) Foreign Application Priority Data

Mar. 21, 2024 (TW) ................................ 113110585

(51) Int. Cl.
*C09J 7/35* (2018.01)
*C09J 7/21* (2018.01)
*C09J 11/06* (2006.01)

(52) U.S. Cl.
CPC . *C09J 7/35* (2018.01); *C09J 7/21* (2018.01); *C09J 11/06* (2013.01); *C09J 2301/304* (2020.08)

(58) Field of Classification Search
CPC .. C09J 7/35; C09J 123/0853; C09J 2301/304; C09J 2431/00
See application file for complete search history.

(56) References Cited

FOREIGN PATENT DOCUMENTS

| | | | | | |
|---|---|---|---|---|---|
| CN | 102559127 | A | | 7/2012 | |
| CN | 108441149 | A | | 8/2018 | |
| CN | 108587521 | A | | 9/2018 | |
| CN | 110591602 | A | | 12/2019 | |
| CN | 111057487 | A | | 4/2020 | |
| CN | 111944463 | A | | 11/2020 | |
| CN | 113980622 | A | * | 1/2022 | ............ C09J 133/00 |
| EP | 0299109 | A1 | * | 1/1989 | ............ A61L 15/56 |

OTHER PUBLICATIONS

Machine translation CN113980622A (Year: 2026).*

* cited by examiner

*Primary Examiner* — Alexandre F Ferre
(74) *Attorney, Agent, or Firm* — CKC & Partners Co., LLC

(57) ABSTRACT

The present invention provides a water-based hot-melt adhesive for healthcare packaging. The water-based hot-melt adhesive includes 25 to 70 parts by weight of an ethylene vinyl acetate copolymer, 5 to 20 parts by weight of an ethylene acrylic acid copolymer, 6.5 to 55 parts by weight of a water-based paraffin, and 5 to 15 parts by weight of particulate wax, in which a particle size of particulate wax is less than 8 μm. A coating layer formed on a medical paper from the water-based hot-melt adhesive of the present invention has great gas-permeability. After the coating layer is sealed with flexible sheet or blister container at the peripheral edges thereof, it has satisfied seal strength and peelability.

16 Claims, No Drawings

WATER-BASED HOT-MELT ADHESIVE AND MEDICAL PAPER COATING WITH WATER-BASED HOT MELT ADHESIVE

CROSS-REFERENCE TO RELATED APPLICATION

This application claims priority to Taiwan patent application serial No. TW113110585, filed on Mar. 21, 2024, the subject matters of which are incorporated herein by reference.

BACKGROUND OF THE INVENTION

Field of Invention

This invention relates to a water-based hot-melt adhesive for forming a hot-melt adhesive coating layer on a medical paper for heat sealing of healthcare packaging. The hot-melt adhesive coating layer of the present invention formed by the disclosed water-based hot melt adhesive provides great seal strength without affecting the gas-permeability required by the healthcare packaging.

Description of Related Art

Healthcare device packaging is used to provide a microbial barrier to keep the healthcare device in a sterilized environment after sterilization and before use. The healthcare devices are commonly sterilized after packaging. The sterilization are steam sterilization, ethylene oxide (EO) sterilization, and radiation sterilization. Different sterilization requires different packaging materials. For example, the packaging material for EO sterilization and steam sterilization has to provide gas-permeability to ensure the steam and EO gas passing through the packaging material to reach the healthcare devices for sterilization. In the existing art, the common materials that provide good microbial barrier effect and gas-permeability, such as medical paper, is widely used as healthcare device packaging materials.

The healthcare device packaging material is processed by heat sealing, that is, a medical paper coated with a heat-sealing adhesive layer is heat sealed with a plastic film or a plastic packaging tray at the peripheral edge thereof. In addition to gas-permeability, the medical packaging material is required to have sufficient heat seal strength and peelability. The insufficient heat seal strength of the material will cause the poor sealing of healthcare device packaging, which may result in the packaging broken due to high gas pressure in the sterilization. Also, excessive heat seal strength may make the packaging difficult to be peeled open or result in the occurrence of fiber tear to contaminate the healthcare devices when peeling open the packaging.

The heat-sealing adhesives used in medical gas-permeable material is hot-melt adhesive. The conventional hot-melt adhesive is prepared by melting and blending thermoplastic resins, tackifiers, waxes, fillers, plasticizers, antioxidants, and additives, and the like. The conventional hot-melt adhesive is then casting into the form of granule, strip, sheet, or film for use, and further, is applied by heat pressing or hot melting. The preparation process of the conventional hot-melt adhesives is complicated. For example, CN108587521A describes an aqueous heat-seal adhesive for medical dialyzing paper, which is prepared by blending thermoplastic resin, resin tackifiers, waxes, emulsifiers, and additives, and the like at 120° C. to prepare a hot-melt adhesive coating liquid. The coating liquid is coated on the medical paper to form a heat-seal layer for providing high seal strength. However, due to the medical paper having lower tear strength, it may result in fiber tear when the packaging is peeled open, which may contaminate the healthcare device. CN110591602A describes a paper lid for a medical packaging tray coated with a surface adhesive layer and a primer layer with different compositions, wherein the adhesion between the surface adhesive layer and the primer layer is less than the adhesion between the surface adhesive layer of the paper lid and the packaging tray. The paper lid is adhered to the packaging tray but can be easily peeled apart without damaging the paper lid. However, the two coating layers on the paper lid increases the manufacture inconvenience. Furthermore, CN108441149A describes a two-step process for preparing a hot-melt adhesive used as a heat seal layer on the medical packaging material. The preparation process comprises mixing and blending thermoplastic resin, resin tackifiers, and waxes at a temperature higher than 160° C. to form hot-melt powders. The powders is then emulsified and dispersed in polyacrylic acid emulsion to prepare a coating liquid. The two-step preparation process increases the manufacture complication. Moreover, the conventional adhesive for heat sealing is prepared by blending thermoplastic resin, tackifier resin, and wax with an organic solvent. However, the organic solvent may be left on the healthcare packaging and is not friendly to the environment.

SUMMARY OF THE INVENTION

The present invention is to provide a water-based hot-melt adhesive for healthcare packaging, which can form a coating layer on a medical paper for heat sealing with flexible sheets or blister containers at the peripheral edges thereof while maintaining the coated medical paper with sufficient gas-permeability for steam sterilization or ethylene oxide (EO) sterilization and seal stability and providing sufficient reliable seal strength and peelability. The water-based hot-melt adhesive of the present invention can be prepared without blending step as required for preparing the conventional hot-melt adhesive, but provide sufficient seal strength and gas-permeability for the healthcare packaging after application. When the heat sealing area is peeled open to open the healthcare packaging, the water-based hot-melt adhesive coating layer provided by the present adhesive is cleanly split to reduce the fiber tear occurred on the medical paper which may cause contamination.

The disclosed water-based hot-melt adhesive for healthcare packaging comprises 25 parts by weight to 70 parts by weight of an ethylene vinyl acetate copolymer, 5 parts by weight to 20 parts by weight of an ethylene acrylic acid copolymer, 6.5 parts by weight to 55 parts by weight of a water-based paraffin, and 5 parts by weight to 15 parts by weight of a particulate wax, wherein a particle size of the particulate wax is less than 8 μm.

In an embodiment of the present invention, the water-based hot-melt adhesive comprises 30 parts by weight to 68 parts by weight of the ethylene vinyl acetate copolymer, 6 parts by weight to 18 parts by weight of the ethylene acrylic acid copolymer, 7 parts by weight to 52 parts by weight of the water-based paraffin and 7 parts by weight to 13 parts by weight of the particulate wax.

In an embodiment of the water-based hot-melt adhesive of the present invention, a weight ratio of the particulate wax and a total weight of the ethylene vinyl acetate copolymer and the ethylene acrylic acid copolymer is in the range from 0.09 to 2.1.

In an embodiment of the water-based hot-melt adhesive of the present invention, a glass transition temperature (Tg) of the ethylene vinyl acetate copolymer is between-40° C. to 10° C. and a melting point thereof is between 200° C. to 300° C.

In an embodiment of the water-based hot-melt adhesive of the present invention, a glass transition temperature (Tg) of the ethylene acrylic acid copolymer is between 0° C. to 10° C. and a melting point thereof is between 70° C. to 110° C.

In an embodiment of the water-based hot-melt adhesive of the present invention, a glass transition temperature (Tg) of the particulate wax is less than 0° C. and a melting point thereof is between 70° C. to 180° C.

In an embodiment of the water-based hot-melt adhesive of the present invention, the particulate wax is selected from the group consisting of Fischer-Tropsch synthetic particulate wax, polypropylene particulate wax, polyethylene particulate wax, oxidized polyethylene particulate wax, microcrystalline wax, and combinations thereof.

In an embodiment of the water-based hot-melt adhesive of the present invention, the particle size of the particulate wax is between 2 μm to 7 μm.

In an embodiment of the water-based hot-melt adhesive of the present invention, a glass transition temperature (Tg) of the water-based paraffin is between −120° C. to −50° C. and a melting point thereof is between 30° C. to 65° C.

In another embodiment of the present invention, the water-based hot-melt adhesive optionally further comprises a water-based polyolefin resin. The water-based polyolefin resin can be hydrophilic modified polyolefin, water-based ionomer, or combinations thereof.

In another embodiment of the present invention, the water-based hot-melt adhesive further comprises 3 parts by weight to 10 parts by weight of the water-based polyolefin resin.

In another embodiment of the water-based hot-melt adhesive of the present invention, the hydrophilic modified water-based polyolefin is selected from the group consisting of hydrophilic modified polyethylene resin, hydrophilic modified polypropylene resin, hydrophilic modified polybutylene resin, hydrophilic modified oxidized polyethylene resin, and combinations thereof.

In another embodiment of the water-based hot-melt adhesive of the present invention, the water-based ionomer is selected from the group consisting of water-based polyethylene ionomer, water-based polypropylene ionomer, water-based polybutylene ionomer, water-based oxidized polyethylene ionomer, and combinations thereof.

In another embodiment of the water-based hot-melt adhesive of the present invention, a weight ratio of the water-based polyolefin resin and the water-based paraffin is between 1:1 to 1:3.

In another aspect, the present invention is to provide a water-based hot-melt adhesive coated medical paper which comprises a medical paper and a hot-melt adhesive coating layer coated on at least one surface of the medical paper, wherein the water-based hot-melt adhesive coating layer comprises 25 parts by weight to 70 parts by weight of the ethylene vinyl acetate copolymer, 5 parts by weight to 20 parts by weight of the ethylene acrylic acid copolymer, 6.5 parts by weight to 55 parts by weight of the water-based paraffin, and 5 parts by weight to 15 parts by weight of the particulate wax, wherein the particle size of the particulate wax is less than 8 μm.

In an embodiment of the present invention, a gas-permeability of the disclosed water-based hot-melt adhesive coated medical paper is less than 600 seconds and the seal strength is more than 300 g/15 mm.

In an embodiment of the water-based hot-melt adhesive coated medical paper of the present invention, a coating amount of the hot-melt adhesive coating layer on the medical paper is in a range of 1 $g/m^2$ to 5 $g/m^2$.

The above and other aspects of the invention will become better understood with regard to the following detailed description of the preferred but non-limiting embodiment(s). These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be affected without departing from the spirit and scope of the novel concepts of the disclosure.

DETAILED DESCRIPTION OF THE INVENTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

In the following description, numerous specific details are described in detail in order to enable the reader to fully understand the following examples. However, embodiments of the present invention may be practiced in case no such specific details.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

The present invention is to provide a water-based hot-melt adhesive for healthcare packaging, which can form a coating layer on a medical paper for heat sealing with flexible sheets or blister containers at the peripheral edges thereof while maintaining the coated medical paper with sufficient gas-permeability and providing sufficient reliable seal strength and peelability. When the heat sealing area is peeled open to open the healthcare packaging, the water-based hot-melt adhesive coating layer provided by the present adhesive is cleanly split to reduce the fiber tear occurred on the medical paper which may cause contamination.

The present invention is to provide a water-based hot-melt adhesive for healthcare packaging. The water-based hot-melt adhesive for healthcare packaging comprises 25 parts by weight to 70 parts by weight of a ethylene vinyl acetate copolymer, 5 parts by weight to 20 parts by weight of a ethylene acrylic acid copolymer, 6.5 parts by weight to 55 parts by weight of a water-based paraffin, and 5 parts by weight to 15 parts by weight of a particulate wax, wherein the particle size of the particulate wax is less than 8 μm.

The disclosed water-based hot-melt adhesive can be applied on a medical paper for healthcare packaging by adding water as solvent, coating on the medical paper, and heating to remove the solvent, to form a water-based hot-melt adhesive coated medical paper. The water-based hot-melt adhesive coating layer coated on the medical paper can be applied a heat sealing process at the temperature of 90° C. to 150° C. The disclosed water-based hot-melt adhesive can be prepared without blending step as required for preparing the conventional hot-melt adhesive. Moreover, the disclosed hot-melt adhesive uses water as solvent instead of organic solvents commonly used in the conventional hot-melt adhesive for healthcare packaging, the organic solvent may remain on the healthcare packaging and is unfriendly to the environment.

The water-based hot-melt adhesive coated medical paper coated with the present water-based hot-melt adhesive can provide sufficient gas-permeability after heat sealing with a flexible sheet or a blister container at the peripheral edges thereof for steam sterilization or ethylene oxide (EO) sterilization. Furthermore, the disclosed water-based hot-melt adhesive provides reliable heat sealing and peelability to meet the heat seal strength required by the healthcare packaging. When the healthcare packaging is peeled open, the packaging will be opened at the seal area by cleanly splitting the water-based hot-melt adhesive coating layer to maintain the seal stability and reduce the incident of fiber tear contamination.

In a preferred embodiment of the present invention, the water-based hot-melt adhesive comprises 30 parts by weight to 68 parts by weight of the ethylene vinyl acetate copolymer, 6 parts by weight 18 parts by weight of the ethylene acrylic acid copolymer, 7 parts by weight to 52 parts by weight of the water-based paraffin, and 7 parts by weight to 13 parts by weight of the particulate wax.

The glass transition temperature (Tg) of the ethylene vinyl acetate copolymer used in the disclosed water-based hot-melt adhesive is between −40° C. to 10° C. and the melting point thereof is between 200° C. to 300° C. The ethylene vinyl acetate copolymer suitably used in the disclosed water-based hot-melt adhesive can be commercial products, such as, DA-104 commercially obtained from Dairen Chemical Corp., Taiwan; EP-645, EAF-68, EP 701K or EP 707K commercially obtained from Wacker Chemical Corporation, Germany; Celvolit 1498 or Celvolit 1475 commercially obtained from Celanese Corp., US, but not limited thereto.

The glass transition temperature (Tg) of the ethylene acrylic acid copolymer used in the water-based hot-melt adhesive of the present invention is between 0° C. to 10° C. and the melting point thereof is between 70° C. to 110° C. The ethylene acrylic acid copolymer suitably used in the disclosed water-based hot-melt adhesive can be commercial products, such as, Novaseal 5132 and Novaseal 5322 commercially obtained from Allinova B.V., Netherland; EuricaCoat 3644 N and EuricaCoat 3624 commercially obtained from Eurikas BV, Belgium; Michem® Prime 498340R commercially obtained from Michelman Inc., US; Aquacer 1061 commercially obtained from BYK-Chemie GmbH, Germany, but not limited thereto.

The disclosed water-based hot-melt adhesive uses the ethylene vinyl acetate copolymer and the ethylene acrylic acid copolymer as the base of the hot-melt adhesive to provide high adhesion between the water-based hot-melt adhesive coating layer prepared thereby and the medical paper. By adding water-based paraffin to the water-based hot-melt adhesive for coating on the medical paper, the peelability of the water-based hot-melt adhesive coated medical paper heat-sealed with a flexible packaging material, such as a polyethylene substrate or a polypropylene substrate, can be enhanced due to the lower melting point of the water-based paraffin, to reduce the occurrence the fiber tear on the medical paper when peeling open the heat-sealed packaging.

The glass transition temperature (Tg) of the water-based paraffin used in the water-based hot-melt adhesive of the present invention is between −120° C. to −50° C. and the melting point thereof is between 30° C. to 65° C. The water-based paraffin suitably used in the disclosed water-based hot-melt adhesive can be commercial products, such as, Novaspers P50 commercially obtained from Allinova B.V., Netherland; AQUACER 497 and AQUACER 539 commercially obtained from BYK-Chemie GmbH, Germany, and the like, but not limited thereto. If an amount of the water-based paraffin in the hot-melt adhesive is excess, the seal strength provided by the hot-melt adhesive coating to the healthcare packaging will decrease. If the amount of the water-based paraffin in the hot-melt adhesive is less, the fiber tear of the medical paper at the sealed area of the healthcare packaging will occur during peeling open the packaging.

The particulate wax used in the disclosed water-based hot-melt adhesive is to decrease a melt viscosity and surface tackiness of the water-based hot-melt adhesive and to adjust a fluidity and wettability but not significantly to decrease the adhesion of the water-based hot-melt adhesive. Furthermore, for enhancing the gas-permeability and the peelability of the disclosed water-based hot-melt adhesive coating layer on the medical paper, the particle size (D50) of the particulate wax is less than 8 μm, and preferably is in the range of 2 μm to 7 μm. If the particle size of the particulate wax exceeds the range, the fiber tear of the medical paper at the sealed area of the healthcare packaging will occur during peeling open the packaging. If the particle size of the particulate wax is less than the range, the gas-permeability of the hot-melt adhesive coating layer will be insufficient.

The particulate wax suitably used in the water-based hot-melt adhesive of the present invention has a glass transition temperature (Tg) less than 0° C. and a melting point between 70° C. to 180° C. The suitable particulate wax can be commercially obtained, such as Fischer-Tropsch synthetic particulate wax, polypropylene particulate wax, polyethylene particulate wax, oxidized polyethylene particulate wax, microcrystalline wax or the combinations thereof, but not limited thereto. Suitable Fischer-Tropsch synthetic particulate wax can be, for example, Sasolwax Spray 30-G, Spray 30G-M, Spray 30G-EF, Spray 105, Spray 105-G, Spray 105G-EF, Sasolwax Aqua 30-G, Aqua 30G-EF commercially obtained from Sasol Ltd., South Africa. Suitable polypropylene particulate wax can be commercial products, such as, CERAFLOUR® 913, CERAFLOUR® 914 commercially obtained from BYK-Chemie GmbH, Germany, or CERETAN® MP2120 commercially obtained from Münzing Chemie GmbH, Germany, and the like. Suitable polyethylene particulate wax can be, such as, CERAFLOUR® 925, CERAFLOUR® 929N commercially obtained from BYK-Chemie GmbH, Germany, CERETAN® MO4715 commercially obtained from Münzing Chemie GmbH, Germany, but not limited thereto.

In an embodiment of the water-based hot-melt adhesive of the present invention, the weight ratio of the particulate wax and the total weight of the ethylene vinyl acetate copolymer and the ethylene acrylic acid copolymer is in the range from 0.09 to 2.1. If less amount of the particulate wax is used, the gas-permeability of the hot-melt adhesive coating layer will be insufficient. If excessive amount of the particulate wax is used, the seal strength of the healthcare packaging will be lowered.

In another embodiment of the water-based hot-melt adhesive of the present invention, the water-based hot-melt adhesive can optionally further comprise a water-based polyolefin resin to enhance the seal strength thereof. The water-based polyolefin resin can be hydrophilic modified water-based polyolefin, water-based ionomer, or the combination thereof.

The hydrophilic modified water-based polyolefin can be polyolefin modified by unsaturated carboxylic acid or the anhydride thereof, for example, introducing carboxyl or anhydride groups into polyolefin, or polyolefin resin added with surfactant. The glass transition temperature (Tg) of the hydrophilic modified water-based polyolefin used in the disclosed water-based hot-melt adhesive can be less than 0° C. and the melting point thereof is higher than 90° C., and preferably, the Tg is less than −100° C. and the melting point is higher than 120° C. The suitable hydrophilic modified polyolefin can be hydrophilic modified polyethylene resin, hydrophilic modified polypropylene resin, hydrophilic modified polybutylene resin, hydrophilic modified oxidized polyethylene resins or the combinations thereof. The hydrophilic modified water-based polyolefin can be commercial products, such as, ALTRIX WPE-09838 from Kelly Chemicals Co., Taiwan; Arrowbase SB-1030N from Unitika Ltd., Japan; HME-118-B from MICA Corp., US, but not limited thereto.

The suitable water-based ionomer used in the water-based hot-melt adhesive of the present invention refers to a polymer that contains copolymers of ethylene and (meth)acrylic acid as a backbone and metal ions introduce above the backbone, and the molecules between itself are cross-linked by the ionic bonds. The glass transition temperature (Tg) of the water-based ionomer suitably used in the present invention is less than 0° C. and the melting point thereof is higher than 80° C., and preferably, the Tg is less than −100° C. and the melting point is higher than 85° C. The suitable water-based ionomers can be water-based polyethylene ionomer, water-based polypropylene ionomer, water-based polybutylene ionomer, water-based oxidized polyethylene ionomer or the combinations thereof. The suitable water-based ionomer can be commercial products, such as, Chemipearl™ S300, S500 from Mitsui Chemicals Inc., Japan; or Surlyn® thermoplastic ionomer from DuPont de Nemours, Inc., US, but not limited thereto.

In another embodiment of the present invention, the water-based hot-melt adhesive can optionally further comprise 3 parts by weight to 10 parts by weight of the water-based polyolefin resin. The weight ratio of the water-based polyolefin resin and the water-based paraffin is between 1:1 to 1:3. If the excessive amount of the water-based polyolefin resin is present in the disclosed adhesive, the fiber tear of the medical paper may occur at the sealed site of the healthcare packaging during peeling open the packaging.

The disclosed water-based hot-melt adhesive can further comprise other additives to enhance the coating processability of the water-based hot-melt adhesive, such as wetting dispersing agent, defoaming agent, thickeners, and the like; to increase the functionality of the water-based hot-melt adhesives, such as, antioxidants, UV stabilizers, antibacterial agents, antistatic agents, and the like. The types and amounts of the additives can be properly selected by person skilled in the related art in accordance with the practical requirements of the hot-melt adhesive.

In another aspect, the present invention is to provide a water-based hot-melt adhesive coated medical paper which comprises a medical paper and a hot-melt adhesive coating layer coated on at least one surface of the medical paper, wherein the water-based hot-melt adhesive coating layer of the present invention comprises 25 parts by weight to 70 parts by weight of the ethylene vinyl acetate copolymer, 5 parts by weight to 20 parts by weight of the ethylene acrylic acid copolymer, 6.5 parts by weight to 55 parts by weight of the water-based paraffin, 5 parts by weight to 15 parts by weight of the particulate wax, wherein the particle size of the particulate wax is less than 8 μm. The gas-permeability of the disclosed water-based hot-melt adhesive coated medical paper is less than 600 seconds (TAPPI (Technical Association of the Pulp and Paper industry) T-460), and the seal strength is more than 300 g/15 mm (ASTM (American Society for Testing and Materials) F-88).

As used herein, the “seal strength” refers to the peel strength required to separate two sealed flexible sheet material, the strength is measured according to ASTM F88 in a “T-peel” test at an elongation speed of 200 mm/min.

As used herein, the “gas permeability” refers to the air resistance of gas passing through a gas-permeable sheet material. According to the TAPPI T-460, it measures the time required for 100 cubic centimeters of air passing through a 1 inch square of sample at a pressure difference of approximately 1.22 kPa.

The suitable medical paper for the disclosed water-based hot-melt adhesive coated medical paper can be the medical paper commonly used in the healthcare packaging, such as, the PeltaMed PurePeelEO from Pelta Medical Papers Ltd, UK or Ethypel® Classic from STERIMED SAS, France, but not limited thereto.

In the disclosed water-based hot-melt adhesive coated medical paper, the coating amount of the water-based hot-melt adhesive coating layer on the medical paper is in the range of 1 $g/m^2$ to 5 $g/m^2$. Particularly, the water-based hot-melt adhesive coating layer can be coated evenly over all the surface of the medical paper or partially at specific area thereof, and the coating amount is in the range of 1 $g/m^2$ to 5 $g/m^2$, and preferably is in the range of 2 $g/m^2$ to 4 $g/m^2$.

The packaging materials suitably sealed with the disclosed water-based hot-melt adhesive coated medical paper can be films or blister containers made from, for example, PET (polyethylene terephthalate), PVC (polyvinyl chloride), PS (polystyrene), PP (polypropylene), PE (polyethylene), PC (polycarbonate), or nylon, but not limited thereto.

The disclosed water-based hot-melt adhesive coated medical paper can be heat sealed with another packaging material as described above at the temperature of 90° C. to 150° C. The seal strength of the sealed packaging is more than 300 g/15 mm and preferably is more than 350 g/15 mm.

The preparation method of the disclosed water-based hot-melt adhesive coated medical paper comprises adding the ethylene acrylic acid copolymer, the water-based paraffin, the particulate wax, and water as solvent into the ethylene vinyl acetate copolymer, and mixing and stirring evenly to form a water-based hot-melt adhesive solution. The prepared water-based hot-melt adhesive solution can be coated on a medical paper and dried at a temperature of 80° C. to 120° C. to evaporate the solvent and to form a water-based hot-melt adhesive coated medical paper. The water-based hot-melt adhesive can be coated by the coating processes commonly used in this technical field, for example, roll coating process, blade coating process, roller coating process, spin coating process, spray coating process, slot-die coating process, or air knife coating process, but not limited thereto.

The disclosed water-based hot-melt adhesive coated medical paper can be heat sealed with flexible sheets or blister containers at the peripheral edges thereof to prepare a healthcare device packaging with sufficient gas permeability for steam sterilization or ethylene oxide (EO) sterilization and sufficient reliable seal strength and peelability. When peeling apart the heat sealing area to open the healthcare packaging, the water-based hot-melt adhesive coating layer is cleanly split to reduce the problem of the contamination to the healthcare device caused by the fiber tear of the medical paper.

The present invention will be explained in further details with reference to the examples. However, the present invention is not limited to these examples.

EXAMPLE

The materials used in the Example were as below:

DA-104: ethylene vinyl acetate copolymer emulsion, melting point 240° C., glass transition temperature (Tg) −10° C. to −20° C., solid content 55%, solvent: water, commercially obtained from Dairen Chemical Corp., Taiwan.

VINNAPAS® EP 707K: ethylene-vinyl acetate copolymer emulsion, melting point>250° C., glass transition temperature (Tg) 7° C., solid content 55%, solvent: water, commercially obtained from Wacker Chemie AG, Germany.

Novaseal 5132: ethylene acrylic acid copolymer dispersion, melting point 89° C. to 103° C., solid content 32%, solvent: water, commercially obtained from Allinova B.V., Netherland.

Aquacer 497: water-based paraffin emulsion, melting point 60° C., solid content 50%, solvent: water, commercially obtained from BYK-Chemie GmbH, Germany.

CHEMIPEARL™ W400: polyethylene particulate wax dispersion, melting point 90° C. to 100° C., average particle size 5 μm, solid content 40%, solvent: water, commercially obtained from Mitsui Chemicals. Inc. Japan.

CHEMIPEARL™ W410: polyethylene particulate wax dispersion, melting point 90° C. to 110° C., average particle size 9 μm, solid content 40%, solvent: water, commercially obtained from Mitsui Chemicals. Inc. Japan.

JONCRYL® Wax 4: polyethylene particulate wax dispersion, melting point 110° C., average particle size 4 μm, solid content 40%, solvent: water, commercially obtained from BASF SE, Germany.

CHEMIPEARL™ S300: polyethylene ionomer dispersion, melting point 96° C., glass transition temperature (Tg) −120° C., solid content 35%, solvent: water, commercially obtained from Mitsui Chemicals. Inc. Japan.

CHEMIPEARL™ S500: polyethylene ionomer dispersion, melting point 89° C., glass transition temperature (Tg) −120° C., solid content 42%, solvent: water, commercially obtained from Mitsui Chemicals. Inc. Japan.

BENTONE® EW-NA: thickener, commercially obtained from Elementis plc, UK.

Rheovis® AS-1125: thickener, commercially obtained from Cognis GmbH, Germany.

PeltaMed PurePeelEO 60 gsm: medical paper (60 g), commercially obtained from PELTA MEDICAL PAPERS Corp. UK.

Example 1

233.3 parts by weight of ethylene vinyl acetate copolymer emulsion (DA-104), 100 parts by weight of ethylene acrylic acid copolymer dispersion (Novaseal 5132), 29.3 parts by weight of water-based paraffin emulsion (Aquacer 497), 50 parts by weight of polyethylene particulate wax dispersion (W400), 2.9 parts by weight of thickener (EW-NA), and 370.4 parts by weight of deionized water were mixed for 30 minutes for evenly dispersion to prepare a water-based hot-melt adhesive solution.

The obtained water-based hot-melt adhesive solution was coated on a medical paper (PeltaMed PurePeelEO 60 gsm) and dried at the temperature of 100° C. for 2 minutes to form a hot-melt adhesive coating layer on the medical paper and to prepare a water-based hot-melt adhesive coated medical paper.

The gas permeability, heat seal strength, and peeling test of the obtained water-based hot-melt adhesive coated medical paper were evaluated by the evaluation methods described herein after. The results were shown in Table 1.

Example 2

233.3 parts by weight of ethylene vinyl acetate copolymer emulsion (DA-104), 100 parts by weight of ethylene acrylic acid copolymer emulsion (Novaseal 5132), 65.3 parts by weight of water-based paraffin emulsion (Aquacer 497), 68 parts by weight of polyethylene particulate wax emulsion (W400), 2.9 parts by weight of thickener (EW-NA), and 410.4 parts by weight of deionized water were mixed for 30 minutes for evenly dispersion to prepare a water-based hot-melt adhesive solution.

The obtained water-based hot-melt adhesive solution was coated on a medical paper (PeltaMed PurePeelEO 60 gsm) and dried at 100° C. for 2 minutes to form a water-based hot-melt adhesive coating layer on the medical paper and to prepare a water-based hot-melt adhesive coated medical paper.

The gas permeability, heat seal strength, and peeling test of the obtained water-based hot-melt adhesive coated medical paper were evaluated by the evaluation methods described herein after. The results were shown in Table 1.

Example 3

233.3 parts by weight of ethylene vinyl acetate copolymer emulsion (DA-104), 100 parts by weight of ethylene acrylic acid copolymer dispersion (Novaseal 5132), 333.3 parts by weight of water-based paraffin emulsion (Aquacer 497), 93.3 parts by weight of polyethylene particulate wax dispersion (W400), 5.2 parts by weight of thickener (EW-NA), and 708.1 parts by weight of deionized water were mixed for 30 minutes for evenly dispersion to prepare a water-based hot melt adhesive solution.

The obtained water-based hot melt adhesive solution was coated on a medical paper (PeltaMed PurePeelEO 60 gsm) and dried at 100° C. for 2 minutes to form a water-based hot-melt adhesive coating layer on the medical paper and to prepare a water-based hot-melt adhesive coated medical paper.

The gas permeability, heat seal strength, and peeling test of the obtained water-based hot-melt adhesive coated medical paper were evaluated by the evaluation methods described herein after. The results were shown in Table 1.

Example 4

233.3 parts by weight of ethylene vinyl acetate copolymer emulsion (DA-104), 100 parts by weight of ethylene acrylic acid copolymer dispersion (Novaseal 5132), 410 parts by weight of water-based paraffin emulsion (Aquacer 497), 103.3 parts by weight of polyethylene particulate wax dispersion (W400), 6 parts by weight of thickener (EW-NA), and 794 parts by weight of deionized water were mixed for 30 minutes for evenly dispersion to prepare a water-based hot-melt adhesive solution.

The obtained water-based hot-melt adhesive solution was coated on a medical paper (PeltaMed PurePeelEO 60 gsm) and dried at 100° C. for 2 minutes to form a water-based hot-melt adhesive coating layer on the medical paper and to prepare a water-based hot-melt adhesive coated medical paper.

The gas permeability, heat seal strength and peeling test of the obtained water-based hot-melt adhesive coated medical paper were evaluated by the evaluation methods described herein after. The results were shown in Table 1.

Example 5

233.3 parts by weight of ethylene vinyl acetate copolymer emulsion (DA-104), 100 parts by weight of ethylene acrylic acid copolymer dispersion (Novaseal 5132), 660 parts by weight of water-based paraffin emulsion (Aquacer 497), 137.3 parts by weight of polyethylene particulate wax dispersion (W400), 7.5 parts by weight of thickener (EW-NA), and 1065.8 parts by weight of deionized water were mixed for 30 minutes for evenly dispersion to prepare a water-based hot-melt adhesive solution.

The obtained water-based hot-melt adhesive solution was coated on a medical paper (PeltaMed PurePeelEO 60 gsm) and dried at 100° C. for 2 minutes to form a water-based hot-melt adhesive coating layer on the medical paper and to prepare a water-based hot-melt adhesive coated medical paper.

The gas permeability, heat seal strength and peeling test of the obtained water-based hot-melt adhesive coated medical paper were evaluated by the evaluation methods described herein after. The results were shown in Table 1.

Example 6

233.3 parts by weight of ethylene vinyl acetate copolymer dispersion (EP 707K), 100 parts by weight of ethylene acrylic acid copolymer dispersion (Novaseal 5132), 40.7 parts by weight of water-based paraffin emulsion (Aquacer 497), 51.3 parts by weight of polyethylene particulate wax dispersion (W400), 2.9 parts by weight of thickener (EW-NA), and 383.8 parts by weight of deionized water were mixed for 30 minutes for evenly dispersion to prepare a water-based hot-melt adhesive solution.

The obtained water-based hot melt adhesive solution was coated on a medical paper (PeltaMed PurePeelEO 60 gsm) and dried at 100° C. for 2 minutes to form a water-based hot-melt adhesive coating layer on the medical paper and to prepare a water-based hot-melt adhesive coated medical paper.

The gas permeability, heat seal strength and peeling test of the obtained water-based hot-melt adhesive coated medical paper were evaluated by the evaluation methods described herein after. The results were shown in Table 1.

Example 7

233.3 parts by weight of ethylene vinyl acetate copolymer dispersion (EP 707K), 100 parts by weight of ethylene acrylic acid copolymer dispersion (Novaseal 5132), 40.7 parts by weight of water-based paraffin emulsion (Aquacer 497), 51.3 parts by weight of polyethylene particulate wax dispersion (Wax 4), 2.9 parts by weight of thickener (EW-NA), and 383.8 parts by weight of deionized water were mixed for 30 minutes for evenly dispersion to prepare a water-based hot-melt adhesive solution.

The obtained water-based hot-melt adhesive solution was coated on a medical paper (PeltaMed PurePeelEO 60 gsm) and dried at 100° C. for 2 minutes to form a water-based hot-melt adhesive coating layer on the medical paper and to prepare a water-based hot-melt adhesive coated medical paper.

The gas permeability, heat seal strength and peeling test of the obtained water-based hot-melt adhesive coated medical paper were evaluated by the evaluation methods described herein after. The results were shown in Table 1.

Example 8

233.3 parts by weight of ethylene vinyl acetate copolymer emulsion (DA-104), 100 parts by weight of ethylene acrylic acid copolymer dispersion (Novaseal 5132), 25.3 parts by weight of polyethylene ionomer dispersion (S500), 40.7 parts by weight of water-based paraffin emulsion (Aquacer 497), 51.3 parts by weight of polyethylene particulate wax dispersion (W400), and 393.3 parts by weight of deionized water were mixed for 30 minutes for evenly dispersion to prepare a water-based hot-melt adhesive solution.

The obtained water-based hot-melt adhesive solution was coated on a medical paper (PeltaMed PurePeelEO 60 gsm) and dried at 100° C. for 2 minutes to form a water-based hot-melt adhesive coating layer on the medical paper and to prepare a water-based hot-melt adhesive coated medical paper.

The gas permeability, heat seal strength and peeling test of the obtained water-based hot-melt adhesive coated medical paper were evaluated by the evaluation methods described herein after. The results were shown in Table 1.

Example 9

233.3 parts by weight of ethylene vinyl acetate copolymer emulsion (DA-104), 100 parts by weight of ethylene acrylic acid copolymer dispersion (Novaseal 5132), 64.7 parts by weight of polyethylene ionomer dispersion (S500), 72 parts by weight of water-based paraffin emulsion (Aquacer 497), 51.3 parts by weight of polyethylene particulate wax dispersion (W400), 4.2 parts by weight of thickener (AS-1125), and 433.3 parts by weight of deionized water were mixed for 30 minutes for evenly dispersion to prepare a water-based hot-melt adhesive solution.

The obtained water-based hot-melt adhesive solution was coated on a medical paper (PeltaMed PurePeelEO 60 gsm) and dried at 100° C. for 2 minutes to form a water-based hot-melt adhesive coating layer on the medical paper and to prepare a water-based hot-melt adhesive coated medical paper.

The gas permeability, heat seal strength and peeling test of the obtained water-based hot-melt adhesive coated medical paper were evaluated by the evaluation methods described herein after. The results were shown in Table 1.

Comparative Example 1

233.3 parts by weight of ethylene vinyl acetate copolymer emulsion (DA-104), 100 parts by weight of ethylene acrylic acid copolymer dispersion (Novaseal 5132), 19.3 parts by weight of water-based paraffin emulsion (Aquacer 497), 46.7 parts by weight of polyethylene particulate wax dispersion (W400), 2.9 parts by weight of thickener (EW-NA), and 363.8 parts by weight of deionized water were mixed for 30 minutes for evenly dispersion to prepare a water-based hot-melt adhesive solution.

The obtained water-based hot melt adhesive solution was coated on a medical paper (PeltaMed PurePeelEO 60 gsm) and dried at 100° C. for 2 minutes to form a water-based hot-melt adhesive coating layer on the medical paper and to prepare a water-based hot-melt adhesive coated medical paper.

The gas permeability, heat seal strength and peeling test of the obtained water-based hot-melt adhesive coated medical paper were evaluated by the evaluation methods described herein after. The results were shown in Table 1.

Comparative Example 2

233.3 parts by weight of ethylene vinyl acetate copolymer emulsion (DA-104), 100 parts by weight of ethylene acrylic acid copolymer dispersion (Novaseal 5132), 40.7 parts by weight of water-based paraffin emulsion (Aquacer 497), 51.3 parts by weight of polyethylene particulate wax dispersion (W410), 2.9 parts by weight of thickener (EW-NA), and 370.4 parts by weight of deionized water were mixed for 30 minutes for evenly dispersion to prepare a water-based hot-melt adhesive solution.

The obtained water-based hot-melt adhesive solution was coated on a medical paper (PeltaMed PurePeelEO 60 gsm) and dried at 100° C. for 2 minutes to form a water-based hot-melt adhesive coating layer on the medical paper and to prepare a water-based hot-melt adhesive coated medical paper.

The gas permeability, heat seal strength and peeling test of the obtained water-based hot-melt adhesive coated medical paper were evaluated by the evaluation methods described herein after. The results were shown in Table 1.

Comparative Example 3

473.3 parts by weight of polyethylene ionomer emulsion (S300), 40.7 parts by weight of water-based paraffin emulsion (Aquacer 497), 51.3 parts by weight of polyethylene particulate wax dispersion (W400), and 260 parts by weight of deionized water were mixed for 30 minutes for evenly dispersion to prepare a water-based hot melt adhesive solution.

The obtained water-based hot-melt adhesive solution was coated on a medical paper (PeltaMed PurePeelEO 60 gsm) and dried at 100° C. for 2 minutes to form a water-based hot-melt adhesive coating layer on the medical paper and to prepare a water-based hot-melt adhesive coated medical paper.

The gas permeability, heat seal strength and peeling test of the obtained water-based hot-melt adhesive coated medical paper were evaluated by the evaluation methods described herein after. The results were shown in Table 1.

The coating amount measurement, gas-permeability test, heat seal strength test, and peeling test were determined as below:

Coating amount measurement: according to EN ISO 536 standard test, samples were obtained by the Sample Cutter 240/100 manufactured by Hans Schmidt & Co GmbH, Germany. The samples from the water-based hot-melt adhesive coated medical paper and the uncoated medical paper were weighted, respectively. The difference of the weights of the two samples was the mass of the coating amount per unit of area (g/m$^2$ (gsm)).

Gas-permeability test: the average time required for 100 cubic centimeters of air to pass through the gas-permeable hot-melt sealing film is measured, according to the TAPPI T-460 standard by Gurley type Densometer Model 4980-D, manufactured by Lesson Industrial Co., Ltd, Taiwan.

Seal strength test: polyethylene (PE) film and the obtained water-based hot-melt adhesive coated medical paper with 10 cm length and 1 cm width was heat pressed by Heat-sealing Machine BS-25 manufactured by Dah Bah Machinery Ind. Inc. Taiwan. The temperature of the top plate is set at 150° C., the temperature of the bottom plate is set at room temperature, the pressure of heat press is 5 kgs, and the time is 3.5 seconds. The sample was measured the maximum value of the tensile force as the seal strength according to the description of ASTM F-88 by Tensile Strength Tester AI-3000 manufactured by Gotech Testing Machines Inc. Taiwan.

Peeling test: the PE film was peeled away from the water-based hot-melt adhesive coated medical paper by hand from the above heat sealed samples and observed if any fiber tear is occurred on the medical paper. If no fiber tear is observed on the medical paper, the evaluation is O, and if fiber tear is observed, the evaluation is X.

TABLE 1

The coating amount, gas permeability, heat seal strength and peeling test of the water-based hot-melt adhesive coated medical paper obtained in Examples and Comparative Examples

| Examples/ Comparative Examples | Coating amount (g/m$^2$) | Gas-permeability (s) | Seal strength (gf/15 mm) | Peeling test |
|---|---|---|---|---|
| Example 1 | 3.4 | 597 | 806 | ○ |
| Example 2 | 3.2 | 582 | 761 | ○ |
| Example 3 | 2.8 | 81 | 515 | ○ |
| Example 4 | 2.8 | 129 | 465 | ○ |
| Example 5 | 2.5 | 63 | 353 | ○ |
| Example 6 | 3.5 | 403 | 734 | ○ |
| Example 7 | 3.8 | 539 | 836 | ○ |
| Example 8 | 2.8 | 288 | 755 | ○ |
| Example 9 | 2.3 | 446 | 818 | ○ |
| Comparative Example 1 | 3.6 | 235 | 707 | X |
| Comparative Example 2 | 3.7 | 2189 | 779 | X |
| Comparative Example 3 | 3.1 | 41 | 937 | X |

From Table 1, the water-based hot-melt adhesive coated medical papers prepared by Examples 1 to 9 provides satisfied gas-permeability and seal strength after heat sealing with PE film. When the PE film was peeling away, the water-based hot-melt adhesive layer was cleanly split to eliminate the fiber tear occurred at medical paper.

Although particular embodiments have been shown and described, it should be understood that the above discussion is not intended to limit the present invention to these embodiments. Persons skilled in the art will understand that various changes and modifications may be made without departing from the scope of the present invention as literally and equivalently covered by the following claims.

What is claimed is:

1. A water-based hot-melt adhesive, comprising: 30 parts by weight to 68 parts by weight of an ethylene vinyl acetate copolymer; 6 parts by weight to 18 parts by weight of an ethylene acrylic acid copolymer; 7 parts by weight to 52 parts by weight of a water-based paraffin; and 7 parts by weight to 13 parts by weight of a particulate wax, wherein a particle size of the particulate wax is less than 8 μm.

2. The water-based hot-melt adhesive as claimed in claim 1, wherein a weight ratio of the particulate wax and a total weight of the ethylene vinyl acetate copolymer and the ethylene acrylic acid copolymer is in a range from 0.09 to 2.1.

3. The water-based hot-melt adhesive as claimed in claim 1, wherein a glass transition temperature (Tg) of the ethylene vinyl acetate copolymer is between −40° C. to 10° C. and a melting point thereof is between 200° C. to 300° C.

4. The water-based hot-melt adhesive as claimed in claim 1, wherein a glass transition temperature (Tg) of the ethylene acrylic acid copolymer is between 0° C. to 10° C. and a melting point thereof is between 70° C. to 110° C.

5. The water-based hot-melt adhesive as claimed in claim 1, wherein a glass transition temperature (Tg) of the particulate wax is less than 0° C. and a melting point thereof is between 70° C. to 180° C.

6. The water-based hot-melt adhesive as claimed in claim 1, wherein the particulate wax is selected from the group consisting of Fischer-Tropsch synthetic particulate wax, polypropylene particulate wax, polyethylene particulate wax, oxidized polyethylene particulate wax and microcrystalline wax, and combinations thereof.

7. The water-based hot-melt adhesive as claimed in claim 1, wherein the particle size of the particulate wax is between 2 μm to 7 μm.

8. The water-based hot-melt adhesive as claimed in claim 1, wherein a glass transition temperature (Tg) of the water-based paraffin is between −120° C. to −50° C. and a melting point thereof is between 30° C. to 65° C.

9. The water-based hot-melt adhesive as claimed in claim 1 further comprises a water-based polyolefin resin, and the water-based polyolefin resin is a hydrophilic modified polyolefin, a water-based ionomer, or the combination thereof.

10. The water-based hot-melt adhesive as claimed in claim 9 further comprises 3 parts by weight to 10 parts by weight of the water-based polyolefin resin.

11. The water-based hot-melt adhesive as claimed in claim 9, wherein the hydrophilic modified polyolefin is selected from the group consisting of hydrophilic modified polyethylene resin, hydrophilic modified polypropylene resin, hydrophilic modified polybutylene resin, hydrophilic modified oxidized polyethylene resin, and combinations thereof.

12. The water-based hot-melt adhesive as claimed in claim 9, wherein the water-based ionomer is selected from the group consisting of water-based polyethylene ionomer, water-based polypropylene ionomer, water-based polybutylene ionomer, water-based oxidized polyethylene ionomer, and combinations thereof.

13. The water-based hot-melt adhesive as claimed in claim 9, wherein a weight ratio of the water-based polyolefin resin and the water-based paraffin is between 1:1 to 1:3.

14. A water-based hot-melt adhesive coated medical paper comprises a medical paper and a water-based hot-melt adhesive coating layer coated on at least one surface of the medical paper, wherein the water-based hot-melt adhesive coating layer comprising: 30 parts by weight to 68 parts by weight of an ethylene vinyl acetate copolymer; 6 parts by weight to 18 parts by weight of an ethylene acrylic acid copolymer; 7 parts by weight to 52 parts by weight of a water-based paraffin; and 7 parts by weight to 13 parts by weight of a particulate wax, wherein a particle size of the particulate wax is less than 8 μm.

15. The water-based hot-melt adhesive coated medical paper as claimed in claim 14, wherein a gas-permeability of the water-based hot-melt adhesive coated medical paper is less than 600 seconds and a seal strength is more than 300 g/15 mm.

16. The water-based hot-melt adhesive coated medical paper as claimed in claim 14, wherein a coating amount of the water-based hot-melt adhesive coating layer on the medical paper is in a range of 1 $g/m^2$ to 5 $g/m^2$.

* * * * *